Figure 1:
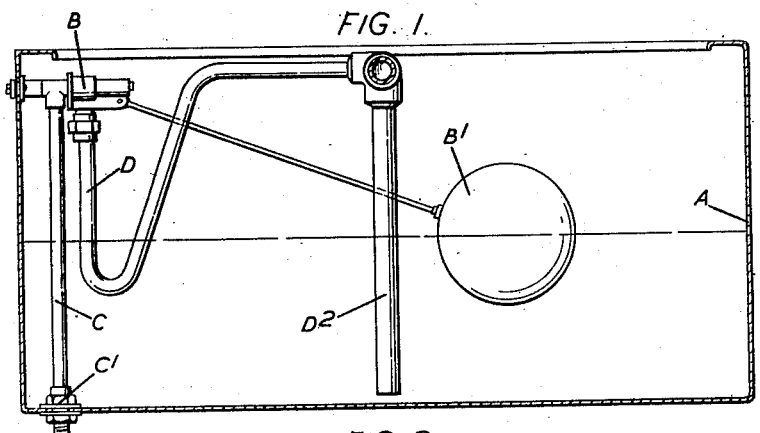

Sept. 2, 1952 G. COLLMAN 2,608,987
WATER SUPPLY OR CONTROL APPARATUS
Filed March 3, 1949 2 SHEETS—SHEET 1

Inventor
Gilbert Collman
by Emery, Holcombe & Blair
Attorneys

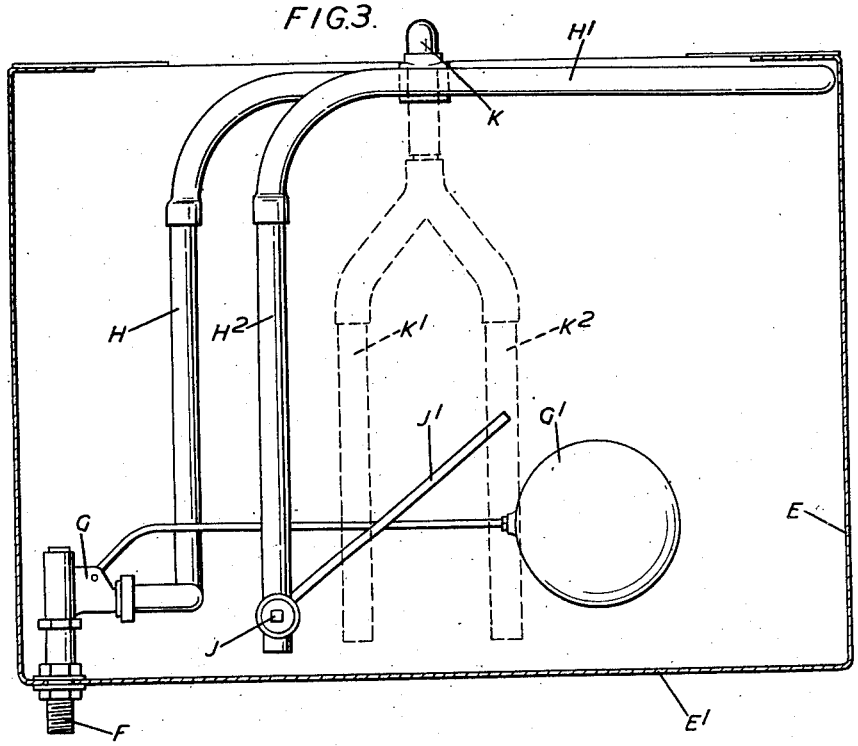
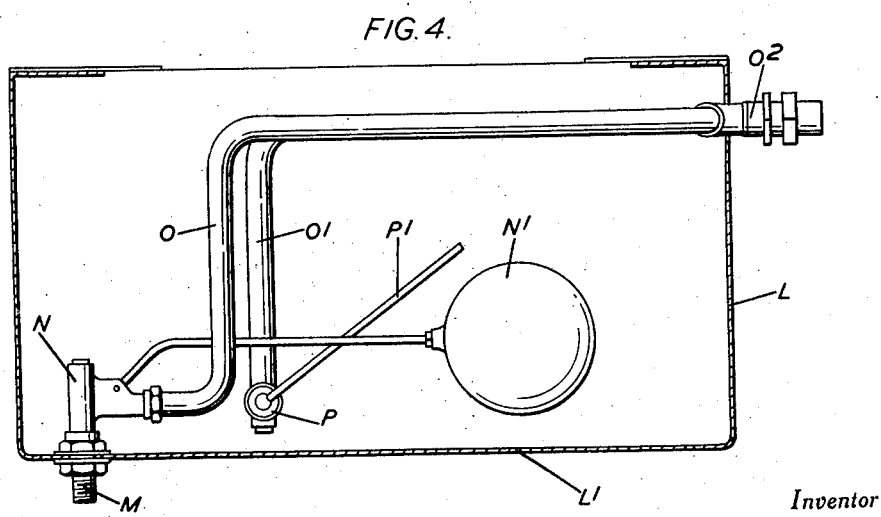

Patented Sept. 2, 1952

2,608,987

UNITED STATES PATENT OFFICE 2,608,987

WATER SUPPLY OR CONTROL APPARATUS

Gilbert Collman, Newton Abbot, England

Application March 3, 1949, Serial No. 79,361
In Great Britain February 27, 1948

10 Claims. (Cl. 137—123)

This invention relates to water supply or control apparatus of the kind in which the supply of water to a tank or reservoir from a source of supply is controlled by a ballcock or like float-operated automatic valve so as to provide for automatic replenishment of the tank or reservoir when the water level drops and to prevent the water level exceeding a desired maximum.

The invention has for its object to provide improved water supply or control apparatus of the above kind applicable to various types of installation, for example to the water supply installations of buildings (hereinafter referred to as domestic water supply systems) of the usual type employing a storage tank from which the hot and/or cold water supply system of the building is supplied or to drinking troughs and the like drinking reservoirs for animals or to so called "back pressure tanks," that is to say, tanks or reservoirs situated at an intermediate level between a main reservoir at higher level and a point or points at which water is to be utilised at a lower level so that the water pressure at the points of consumption is only that corresponding to the water level in the back pressure tank.

Water supply or control apparatus according to the present invention includes a reservoir or tank, a main supply pipe leading to a control valve of the ballcock or other float-operated type situated in the tank and main and subsidiary delivery pipes communicating with the outlet from the control valve and in free communication with one another, with the subsidiary delivery pipe leading into the tank while the main delivery pipe leads to the point or points from which water is to be drawn.

When apparatus according to the invention is applied to a drinking trough for animals the main delivery pipe will lead into the trough from which the animals are to drink while the tank containing the ball or float actuating the control valve will be secured to the trough in such a position that the maximum water level in the tank will be that appropriate for the maximum level in the trough since the apparatus will act to maintain the water level the same in the tank and trough.

In one application of the present invention to a domestic water supply system an arrangement similar to that described above with reference to a drinking trough may be used but with the main storage tank replacing the trough. Preferably, however, when the invention is applied to a domestic water supply system the normal storage tank constitutes the tank containing the ball or float actuating the control valve and, while the subsidiary delivery pipe leads into the tank, the main delivery pipe leads direct to the hot and/or cold water system of the domestic or like premises, for example to the hot water cylinder and/or any cold water taps not drawing water direct from the mains.

Similarly when the invention is applied to a water supply system including a back pressure tank the tank itself will contain the ball or other float actuating the control valve and, while the subsidiary delivery pipe leads into the tank, the main delivery pipe will lead, preferably over the upper edge of the tank, to the lower level where the water is to be consumed.

In any case but more especially in domestic water supply systems a manually operated shut-off valve may be provided in the subsidiary delivery pipe so that if this valve is closed and the control valve is open water pressure from the mains (or in the case of a back pressure tank from the main reservoir) can be applied direct to the main delivery pipe for the purpose of removing airlocks, forcing out obstructions, pressure testing or other purposes. Such a shut-off valve will preferably be arranged below the normal water level in the tank so that any leaks therein when it is open will not prejudice the operation of the apparatus, as by admitting air when the subsidiary delivery pipe acts as part of a syphon system.

In any case the arrangement is preferably such that the ballcock or like float-operated valve is situated at a point in the reservoir below the normal water level and preferably near to the bottom of the reservoir so that it will be submerged at all times. In this way difficulties due to the entry of air into the delivery pipes by leakage through the valve tend to be avoided.

The invention may be employed for the control of the supply of water for a variety of purposes and the details of construction may vary considerably to suit requirements. Three constructions of apparatus incorporating the present invention and certain applications of the invention will, however, be described with reference to the accompanying drawings, in which Figure 1 is a sectional side elevation of one form of apparatus according to the invention, the section being taken on the line I—I of Figure 2, Figure 2 is a plan view of the apparatus shown in Figure 1, Figure 3 is a similar view to Figure 1 of an alternative construction according to the invention, Figure 4 is a similar view to Figure 3 of a still further construction according to the invention, and Figure 5 shows diagrammatically one use of the invention.

Figure 2:
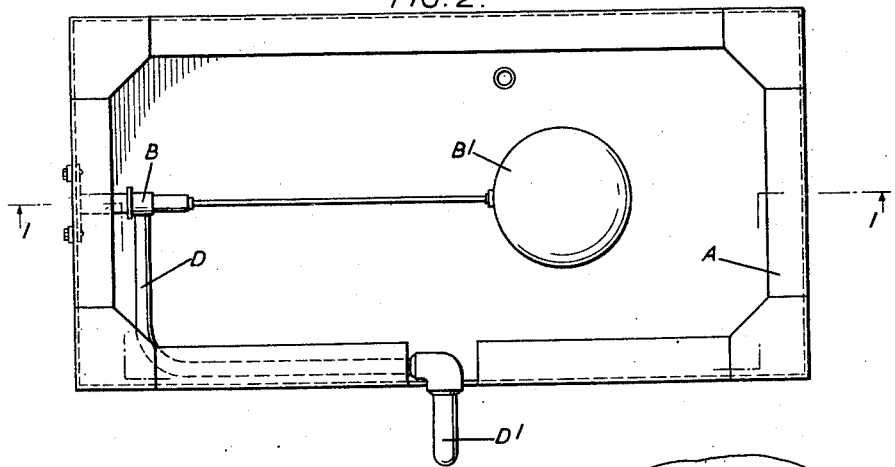

In the construction illustrated in Figures 1 and 2 the apparatus comprises a reservoir or tank A to one wall of which is secured in known manner the valve portion B of a ballcock having the usual control arm and ball $B^1$. Water is delivered to the valve B through a supply pipe C passing through a water-tight gland $C^1$ in the bottom of the tank while to the outlet of the valve is connected in a water tight manner a delivery pipe D leading first downward to a point below the normal water level in the tank and then upward to a point above such normal water level to a point where it branches into a main delivery pipe $D^1$ leading over the edge of the tank A to the point or points at which water is to be used, and a subsidiary delivery pipe $D^2$ extending downwards within the tank A to a point adjacent to its base.

Figure 5:
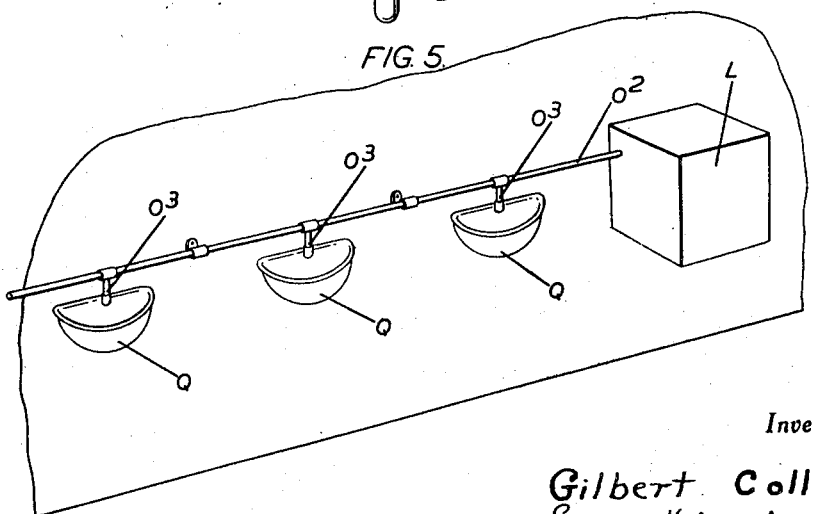

It will be seen that with the arrangement shown in Figures 1 and 2 assuming the water in the tank A to be at the level at which it is normally maintained by the ballcock B, $B^1$, and the main delivery pipe $D^1$ to be dipping into a container such as a drinking trough of large size or series of such troughs (as shown in Figure 5) of large capacity as compared with the tank A and to which the tank A is attached, the water in the drinking trough or troughs will normally be maintained at the same level as that in the tank since the pipes $D^1$, $D^2$ constitute a syphon. If now water is withdrawn from the drinking trough or troughs so that the level therein is lowered, water will flow through the pipes $D^1$, $D^2$ from the tank A thus similarly lowering the level therein. This causes the ball $B^1$ to open the valve B in known manner so that water will flow through the pipe D. As long as the water in the drinking trough is below that in the tank A this water will tend to flow through the pipe $D^1$ directly into the trough while, as soon as the levels in the tank and the trough are again the same but below the normal level, the water will tend to flow through both the pipes $D^1$ and $D^2$, but in proportion to the relative plan areas of the trough and the tank, so that the greater proportion flows through the pipe $D^1$ directly into the trough until the normal level is again established in both tanks.

Thus, the arrangement provides a convenient means for maintaining the level of water in a drinking trough without the necessity for an under-water connection between the tank and the trough while ensuring the comparatively rapid replenishment of the trough when water is drawn from it, since the greater part of the water does not have to flow first into the tank and then through a further connection into the trough but will flow directly from the valve B into the trough.

It will be understood that in applying the invention the pipe $D^1$ instead of dipping into a drinking trough or other reservoir from which water is to be drawn may be connected to a pipe system as illustrated in Figure 5 for supplying one or more drinking troughs, flushing cisterns, taps or other points of water consumption as is well understood by those skilled in the art.

In the modified arrangement shown in Figure 3 the apparatus comprises a tank E through the bottom $E^1$ of which passes in a water-tight manner a supply pipe F from the water mains on which is mounted a ballcock comprising a valve G situated near the bottom of the tank E and the usual arm and ball $G^1$ arranged so that it closes the valve when the ball rises to a point adjacent to but below the top of the tank.

The outlet from the valve G is connected to a delivery pipe H which, as shown, extends upwards to a level near the top of the tank, then around the inner periphery of part of the top of the tank as shown at $H^1$ and down again within the tank to a point adjacent to the bottom thereof as shown at $H^2$, the lower end of the pipe part $H^2$ being provided with a valve J having a lever $J^1$ by which it can be opened and closed at will.

The pipe parts $H^1$, $H^2$ constitute a subsidiary delivery pipe from which at a suitable point a main delivery pipe K branches and extends over the edge of the tank, this main delivery pipe itself dividing into two branches $K^1$, $K^2$ which can be connected to the pipes in a domestic water system leading respectively to the hot water tank and to the cold water taps.

The arrangement shown in Figure 4 is generally similar to that shown in Figure 3 and comprises a tank L through the bottom $L^1$ of which leads the main supply pipe M on which is mounted a ballcock comprising the usual valve N and the arm and ball member $N^1$. As in the construction shown in Figure 3 the outlet from the valve N is connected to a delivery pipe O which extends first upwards to a point a little below the top of the tank and then around part of the inner periphery of the tank and finally downwards again as shown at $O^1$ to a point near the bottom of the tank where it is provided with a valve P provided with a control lever $P^1$. A main delivery pipe $O^2$ branches from the pipe O so that the part $O^1$ constitutes a subsidiary delivery pipe, the main delivery pipe $O^2$ extending through the wall of the tank as shown and being arranged for connection to a pipe or pipes leading to the point or points where water is to be drawn off.

Assuming the arrangement shown in Figure 3 or Figure 4 to have the pipes $K^1$, $K^2$ or the pipe $O^2$ connected to a domestic water system, the tank, being located in the normal manner above the level of the highest point from which water is to be drawn, the ballcock G, $G^1$ or N, $N^1$ will normally open whenever the water level in the tank falls below the normal level due to water being drawn off and close when that level has been restored. It will be seen, however, that instead of all the water which is drawn off having to enter the tank and then flow therefrom into the domestic water system, as in the usual arrangements at present in use, after an initial flow of water through the pipe $K^1$, $K^2$ or $O^2$ has lowered the level of water in the tank E or L so that the valve G or N opens, the water which then flows through the valve can flow direct to the pipe $K^1$, $K^2$ or $O^2$. When the withdrawal of water ceases, the water entering through the valve G or N will then flow into the tank until the level is restored and the valve therefore closes.

Further, it will be seen that when the domestic water system is to be filled with water from the empty state, for example after first installation or after being drained for repair or for other reasons, if the water supply to the ballcock B, $B^1$ or G, $G^1$, is turned on while the valve J or P is closed, the domestic water system can be made subject to the pressure of the mains, thus ensuring against the formation of air locks and/or enabling a pressure test to be applied to the system. Similarly, if an air lock should occur in the domestic water system, it may be cleared by applying to the system the mains pressure by closing the valve J or P and pressing down the ball G¹ or N¹. It will be understood, however, that during normal operation the valve J or P will be left in the open position.

Another use of apparatus according to the invention is shown diagrammatically in Figure 5 in which L is for example the tank L shown in Figure 4 and O² the main delivery pipe therefrom. This delivery pipe has a series of downward branches O³ each dipping into a drinking trough Q to a point near its bottom, the troughs being installed, for example, in a cow house. The tank L is so disposed in relation to the troughs Q that the normal water level in the tank is the level required to be maintained in the troughs.

With this arrangement it will be seen that, as long as the level in the tank L and all the troughs Q is normal, the valve N will remain closed. When water is withdrawn from one or more of the troughs, as by a cow drinking, however, water will immediately begin to flow from the tank L to replenish the water withdrawn, thus lowering the level in the tank so that the valve N is opened.

It will also be seen that, assuming the system to be empty with the main supply through the pipe M cut off, the turning on of this supply and the consequent flow through the valve N will fill not only the tank L but also the troughs so that the necessary syphon through the pipes O² and O¹ is automatically formed.

What I claim as my invention and desire to secure by Letters Patent is:

1. A water supply and control apparatus including a reservoir, a main supply pipe, a float-operated control valve in the reservoir controlling the flow of water from the main supply pipe, and main and subsidiary delivery pipes both communicating directly with the outlet of the control valve to receive water therefrom and in free communication with each other, the subsidiary delivery pipe being arranged for the delivery of water from the said control valve to a point within said reservoir adjacent to the bottom thereof while the main delivery pipe is adapted to be led to at least one point below the level of water in the reservoir from which point water is to be drawn, the arrangement providing for water flow through the control valve into the reservoir through the subsidiary pipe and for water flow through the control valve direct to a point from which water is to be drawn without entering the reservoir, and for water flow from the reservoir by siphon action to said point independently and simultaneously.

2. A water supply or control apparatus as claimed in claim 1, including a shut-off valve in the subsidiary delivery pipe by which it can be opened and closed at will.

3. A water supply or control apparatus as claimed in claim 2, in which the shut-off valve is situated in the subsidiary delivery pipe at a point adjacent to the bottom of the reservoir.

4. A water supply or control apparatus as claimed in claim 1, in which the float-operated valve is situated in the reservoir at a point adjacent to the bottom thereof and below the water level maintained therein by said valve.

5. A water supply or control apparatus as claimed in claim 1, in which the float operated valve is situated in the reservoir at a point adjacent to the bottom thereof and a shut-off valve is provided in the subsidiary delivery pipe at a point adjacent to the bottom of the reservoir.

6. A water supply or control apparatus as claimed in claim 1, in which the junction between the main and subsidiary delivery pipes is situated at a point above the normal water level in the reservoir.

7. A water supply system comprising a series of water receptacles in which the normal water level is to be the same, a main delivery pipe having branches leading to the receptacles and terminating therein at points below the normal water level, and supply apparatus comprising a reservoir, a main supply pipe, a float-operated control valve in the reservoir controlling the flow of water thereto from the main supply pipe, a subsidiary delivery pipe one end of which is connected to and in free communication with the main delivery pipe while the other extends to a point within the reservoir adjacent to the bottom thereof, and a passage connecting the outlet from the control valve directly to the main and subsidiary delivery pipes whereby water flowing through the control valve can enter the reservoir through the subsidiary delivery pipe and can flow direct to a point from which water is to be drawn without entering the reservoir and water from the reservoir can flow to said point independently and simultaneously.

8. A water supply system comprising a pipe system having one or more valve-controlled delivery points, a reservoir, a main supply pipe, a float-operated control valve controlling the flow of water to the reservoir from the main supply pipe, a main delivery pipe connected to the water supply system and a subsidiary delivery pipe leading to a point adjacent to the bottom of the reservoir, the main and subsidiary delivery pipes being in direct and free communication with one another and directly connected to the outlet of the control valve, and a shut-off valve in the subsidiary delivery pipe by which it can be closed at will, whereby water flowing through the control valve can enter the reservoir through the subsidiary delivery pipe and can flow direct to a point from which water is to be drawn without entering the reservoir and water from the reservoir can flow to said point independently and simultaneously when said shut-off valve is open.

9. A water supply system as claimed in claim 8, in which the shut-off valve is situated in the subsidiary delivery pipe at a point adjacent to the bottom of the reservoir.

10. A water supply system as claimed in claim 1 in which the outlet of the control valve comprises a pipe leading from the control valve downwards in the reservoir to a point below water level and then upwards to a point at which it branches into the main and subsidiary delivery pipes.

GILBERT COLLMAN.

REFERENCES CITED

The following references are of record in the file of this patent:

UNITED STATES PATENTS

| Number | Name | Date |
|---|---|---|
| 529,547 | Eberly | Nov. 20, 1894 |
| 636,681 | Morrison | Nov. 7, 1899 |
| 853,850 | Woodall | May 14, 1907 |
| 912,241 | Hart | Feb. 9, 1909 |
| 1,063,468 | Pribil | June 3, 1913 |
| 1,076,351 | Crowell | Oct. 21, 1913 |
| 1,566,176 | Weber | Dec. 15, 1925 |
| 1,786,049 | Zoeller | Dec. 23, 1930 |